(12) United States Patent
Lee

(10) Patent No.: US 11,716,752 B2
(45) Date of Patent: Aug. 1, 2023

(54) METHOD AND DEVICE FOR RESELECTING SIDELINK TRANSMISSION RESOURCE IN NR V2X

(71) Applicant: LG Electronics Inc., Seoul (KR)

(72) Inventor: Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/987,371

(22) Filed: Nov. 15, 2022

(65) Prior Publication Data

US 2023/0083277 A1    Mar. 16, 2023

Related U.S. Application Data

(63) Continuation of application No. PCT/KR2021/006131, filed on May 17, 2021.

(60) Provisional application No. 63/030,893, filed on May 27, 2020, provisional application No. 63/025,981, filed on May 15, 2020.

(51) Int. Cl.
| | |
|---|---|
| *H04W 72/56* | (2023.01) |
| *H04W 72/02* | (2009.01) |
| *H04W 72/0446* | (2023.01) |
| *H04W 72/20* | (2023.01) |
| *H04W 80/02* | (2009.01) |

(52) U.S. Cl.
CPC ........... *H04W 72/56* (2023.01); *H04W 72/02* (2013.01); *H04W 72/0446* (2013.01); *H04W 72/20* (2023.01); *H04W 80/02* (2013.01)

(58) Field of Classification Search
None
See application file for complete search history.

(56) References Cited

U.S. PATENT DOCUMENTS

| | | | | |
|---|---|---|---|---|
| 2018/0139669 A1* | 5/2018 | Jung | ..................... | H04W 36/06 |
| 2019/0289615 A1* | 9/2019 | Lee | ........................ | H04W 92/18 |
| 2021/0227465 A1* | 7/2021 | Kung | ..................... | H04W 76/27 |

FOREIGN PATENT DOCUMENTS

| | | |
|---|---|---|
| WO | WO2019087371 | 5/2019 |
| WO | WO2020033381 | 2/2020 |
| WO | WO2020064325 | 4/2020 |

OTHER PUBLICATIONS

Qualcomm Incorporated, "Sidelink Resource Allocation Mechanism for NR V2X," R1-2002539, Presented at 3GPP TSG RAN WG1 Meeting #100bis-e, Apr. 20-Apr. 30, 2020, 22 pages.

(Continued)

*Primary Examiner* — Nguyen H Ngo
(74) *Attorney, Agent, or Firm* — Fish & Richardson P.C.

(57) ABSTRACT

An embodiment of the present disclosure provides a method for performing sidelink communication by a first device. The method may comprise the steps of reserving periodic transmission resources on the basis of a first priority value; generating a MAC PDU related to a second priority value; on the basis of the second priority value, determining whether to reselect a first SL resource among the periodic transmission resources; and on the basis of the determination on whether to reselect the first SL resource, transmitting the MAC PDU and SCI including the second priority value to a second device, wherein the first SL resource is at least one SL resource after the MAC PDU is generated.

20 Claims, 19 Drawing Sheets

(56) References Cited

OTHER PUBLICATIONS

ZTE & Sanechips, "Mode 2 resource allocation schemes on sidelink," R1-1912553, Presented at 3GPP TSG RAN WG1 #99, Reno, Nevada, US, Nov. 18-22, 2019, 12 pages.

\* cited by examiner

FIG. 10
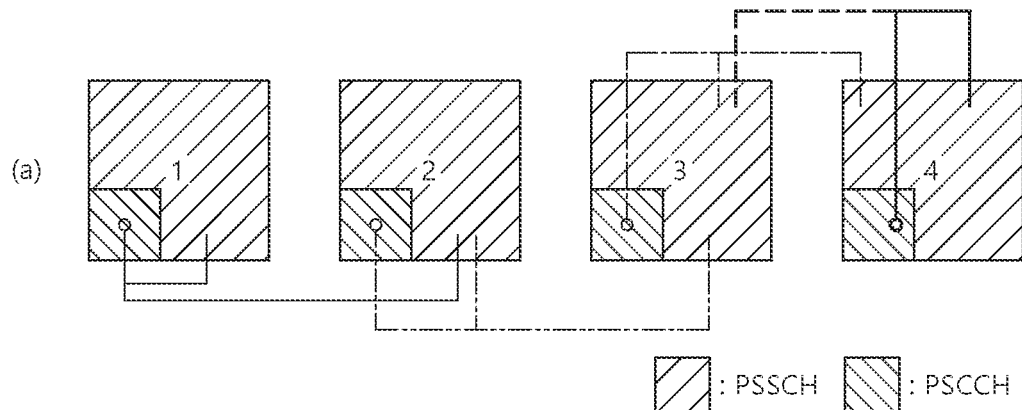
(a)
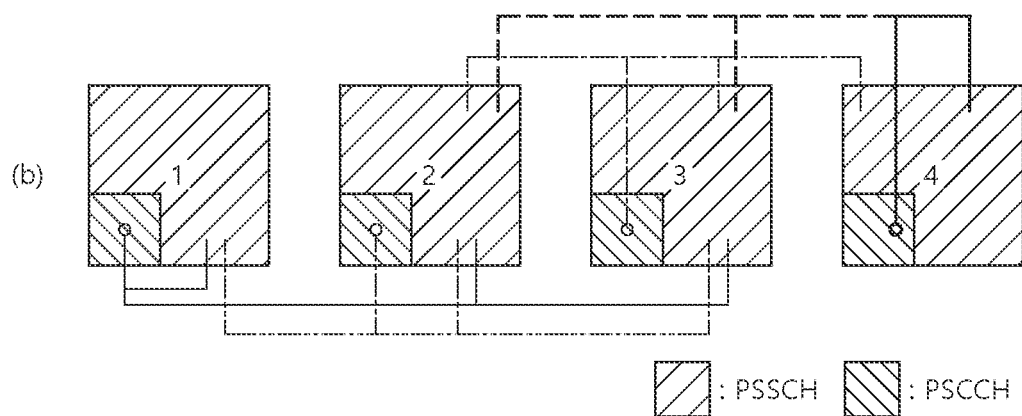
(b)
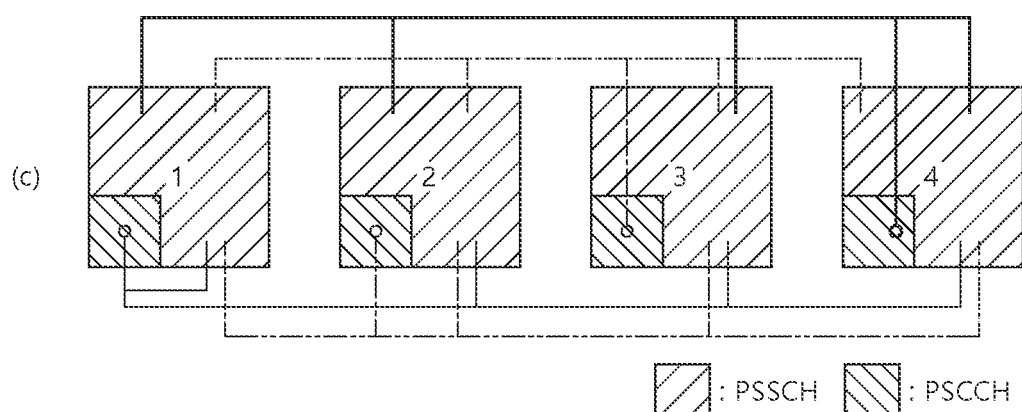
(c)

METHOD AND DEVICE FOR RESELECTING SIDELINK TRANSMISSION RESOURCE IN NR V2X

CROSS-REFERENCE TO RELATED APPLICATIONS

Pursuant to 35 U.S.C. § 119(e), this application is a continuation of International Application PCT/KR2021/006131, with an international tiling date of May 17, 2021, which claims the benefit of U.S. Provisional Patent Application No. 63/025,981, filed on. May 15, 2020 and U.S. Provisional Patent Application No. 63/030,893, filed on May 27, 2020, the contents of which are hereby incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR), Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAI used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

An object of the present disclosure is to provide a sidelink (SL) communication method between devices (or UEs) and a device (or UE) for performing the same.

Another object of the present disclosure is to provide a method of reselecting an SL transmission resource in NR V2X, and a device (or UE) for performing the same.

According to an embodiment of the present disclosure, there may be provided a method in which a first device performs SL communication. The method may include reserving a periodic transmission resource, based on a first priority value, generating a medium access control (MAC) protocol data unit (PDU) related to a second priority value, determining whether to reselect a first SL resource from among the periodic transmission resources, based on the second priority value, and transmitting the MAC PDU and sidelink control information (SCI) including the second priority value to a second device, based on the determination on whether to reselect the first SL resource. The first SL resource may be at least one SL resource after a time at which the MAC PDU is generated.

According to an embodiment of the present disclosure, there may be provided a first device performing sidelink communication. The first device may include at least one memory storing instructions, at least one transceiver, and at least one processor connecting the at least one memory and the at least one transceiver. The at least one processor may control the at least one transceiver to reserve a periodic transmission resource, based on a first priority value, generate a MAC PDU related to a second priority value, determine whether to reselect a first SL resource from among the periodic transmission resources, based on the second priority value, and transmit the MAC PDU and SCI including the second priority value to a second device, based on the determination on whether to reselect the first SL resource. The first SL resource may be at least one SL resource after a time at which the MAC PDU is generated.

The user equipment (UE) can efficiently perform SL communication.

BRIEF DESCRIPTION OF THE DRAWINGS

FIG. 10 shows a method in which a UE that has reserved transmission resource(s) informs another UE of the transmission resource(s), based on an embodiment of the present disclosure.

DESCRIPTION OF EXEMPLARY EMBODIMENTS

Figure 1:
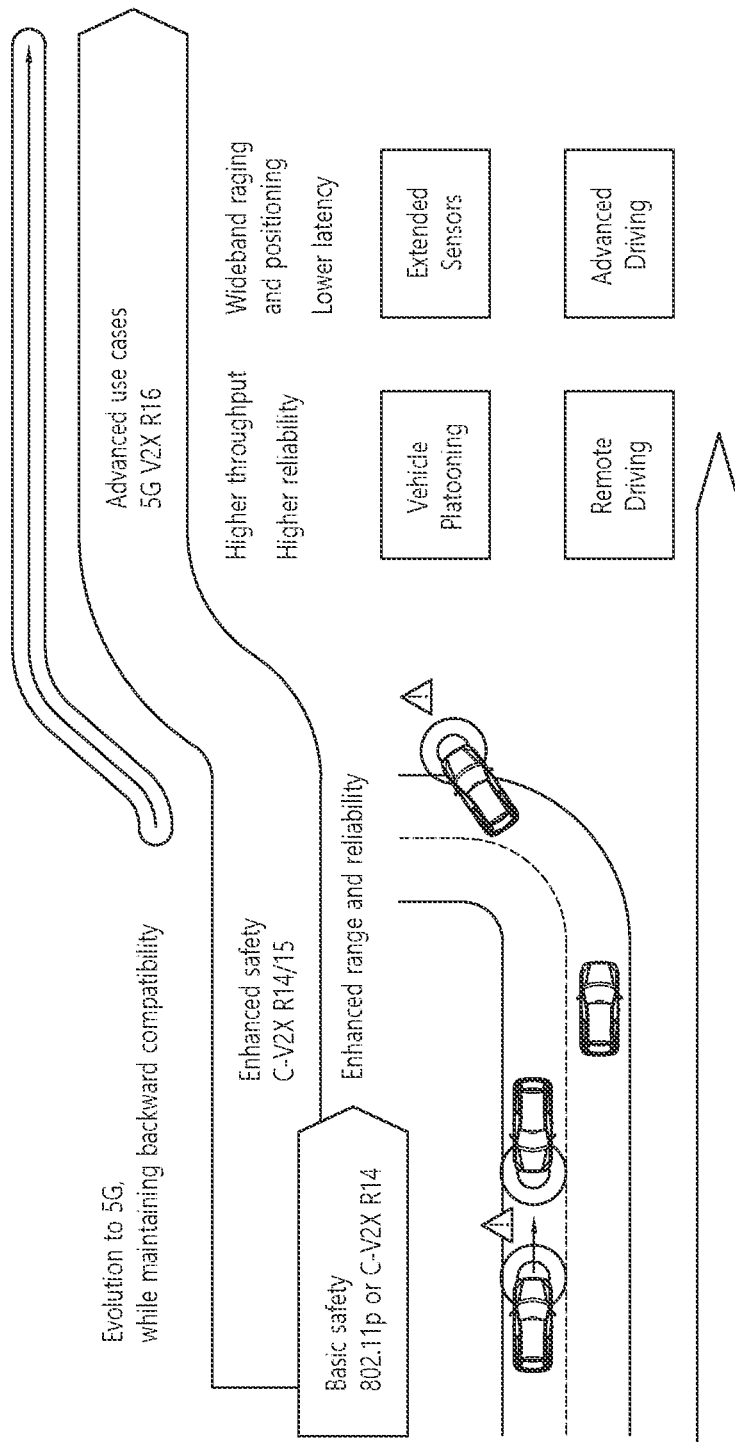
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (TDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi) IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
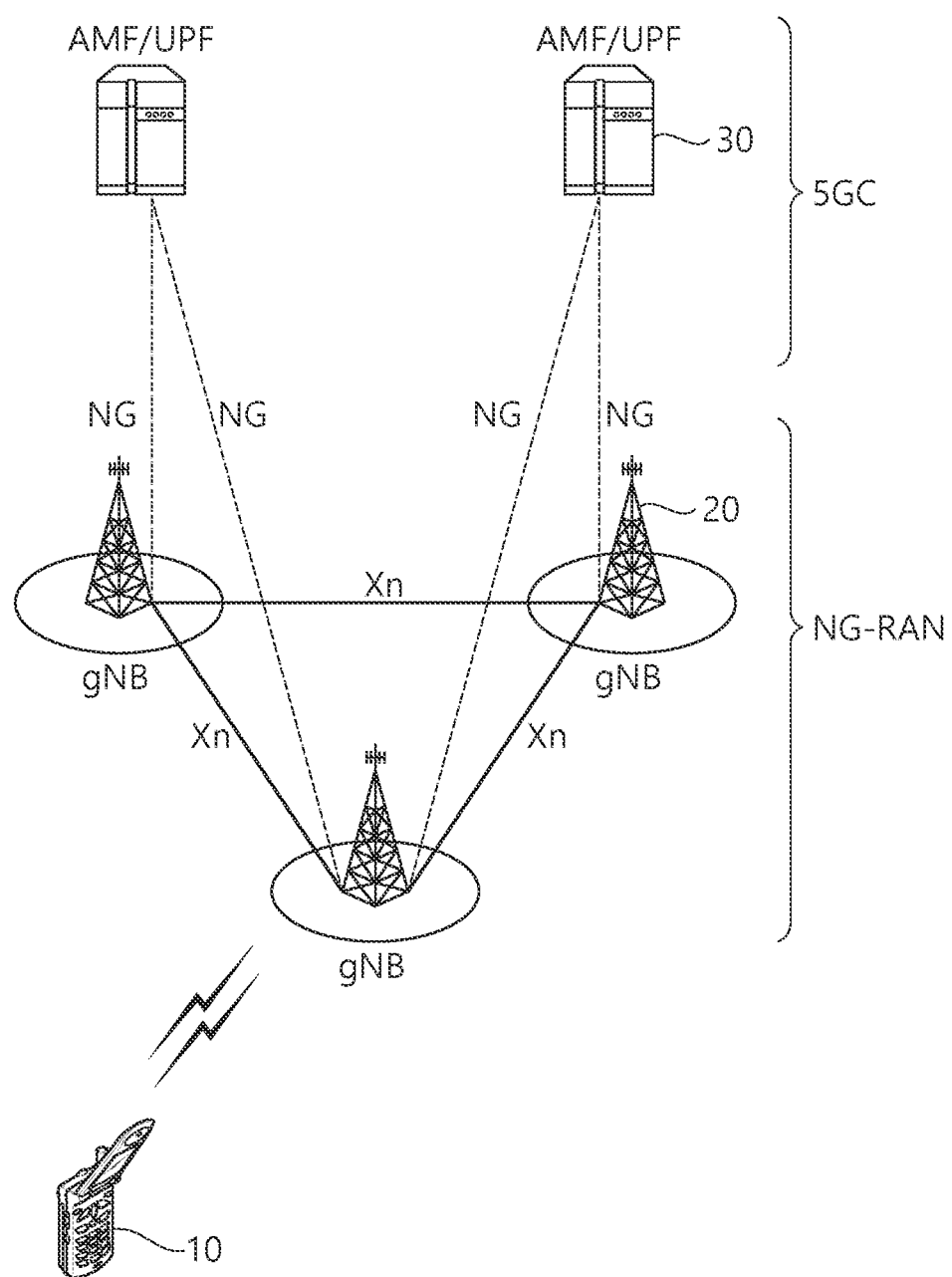
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
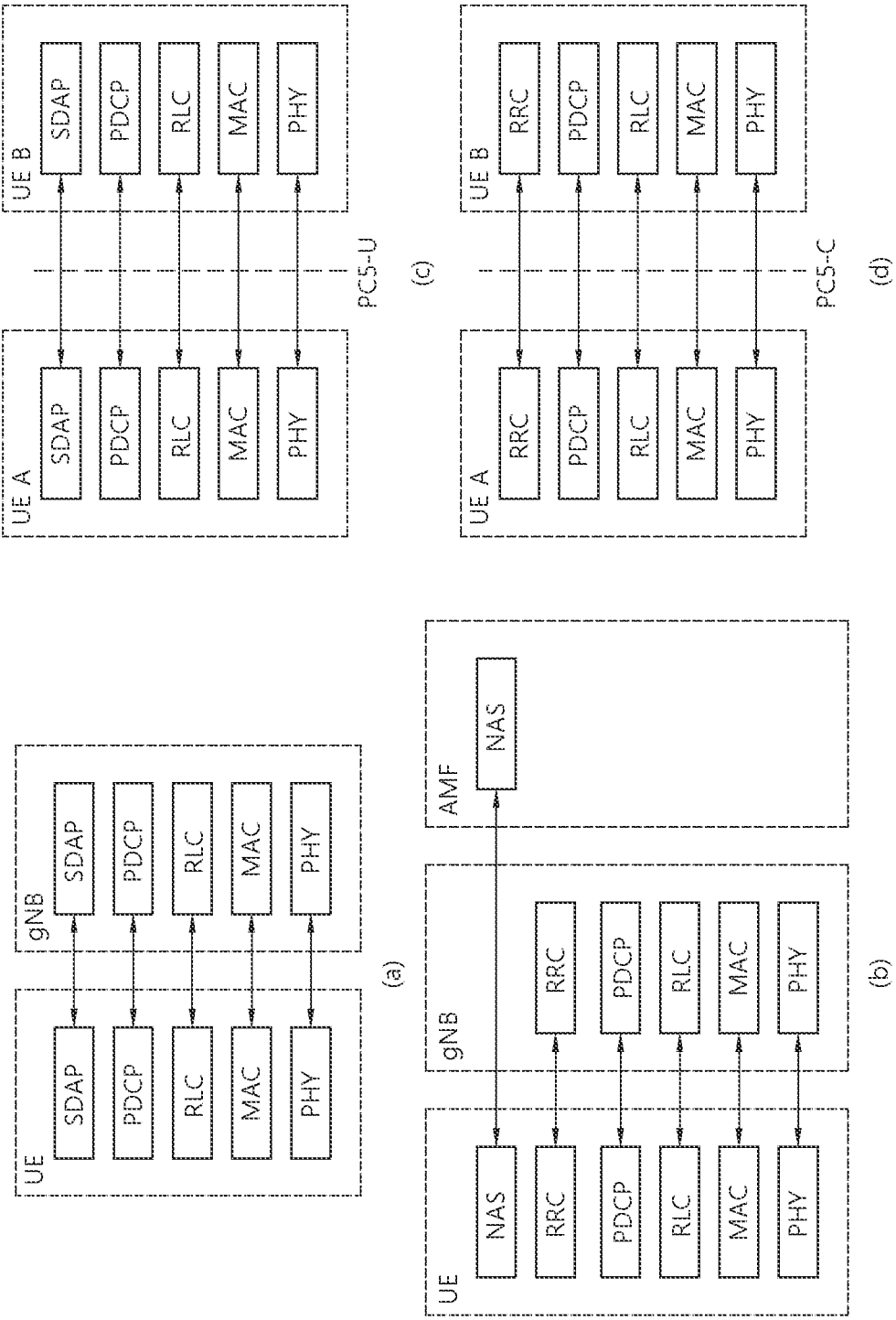
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE, through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
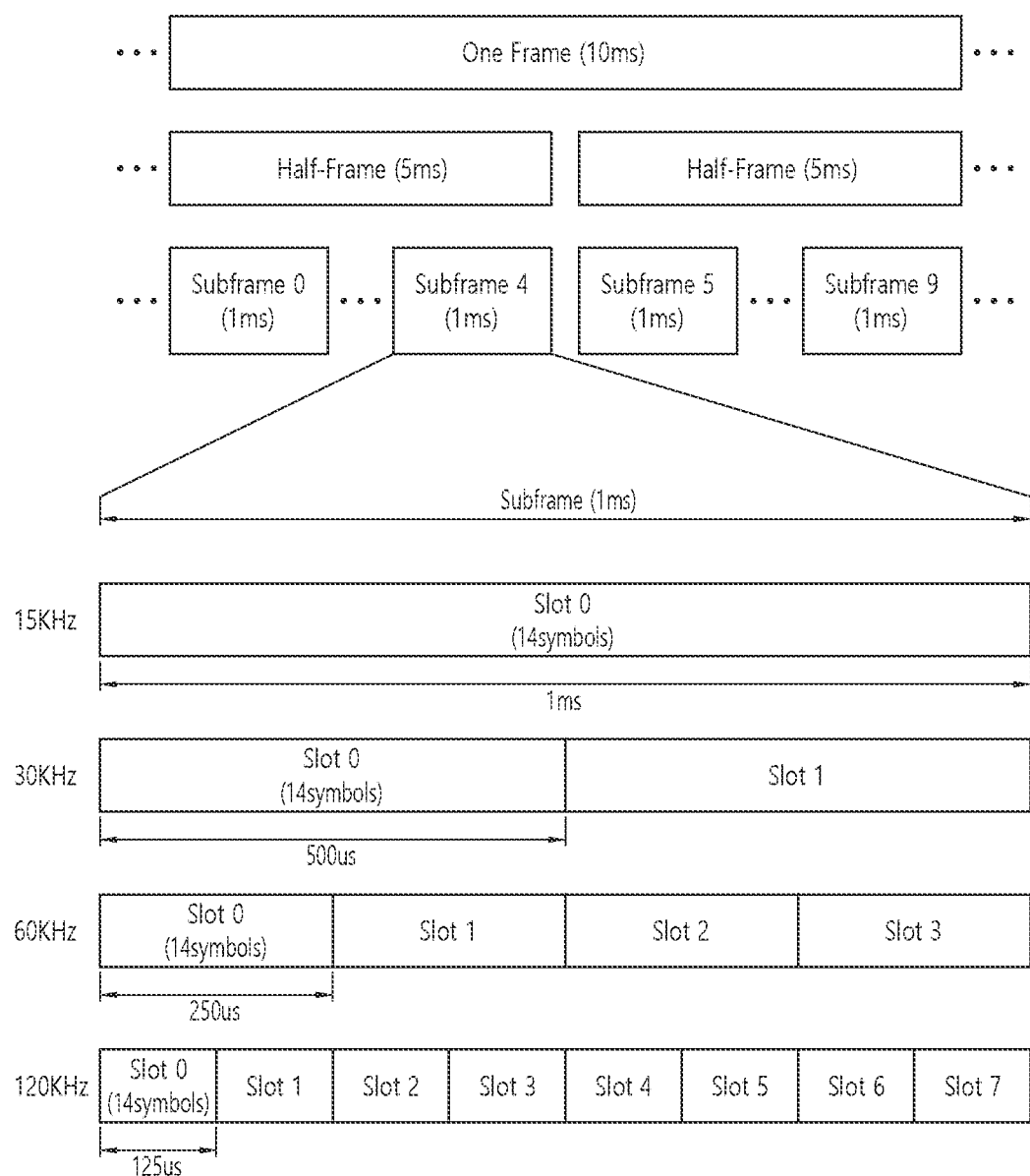
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2$^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*$2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 241.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
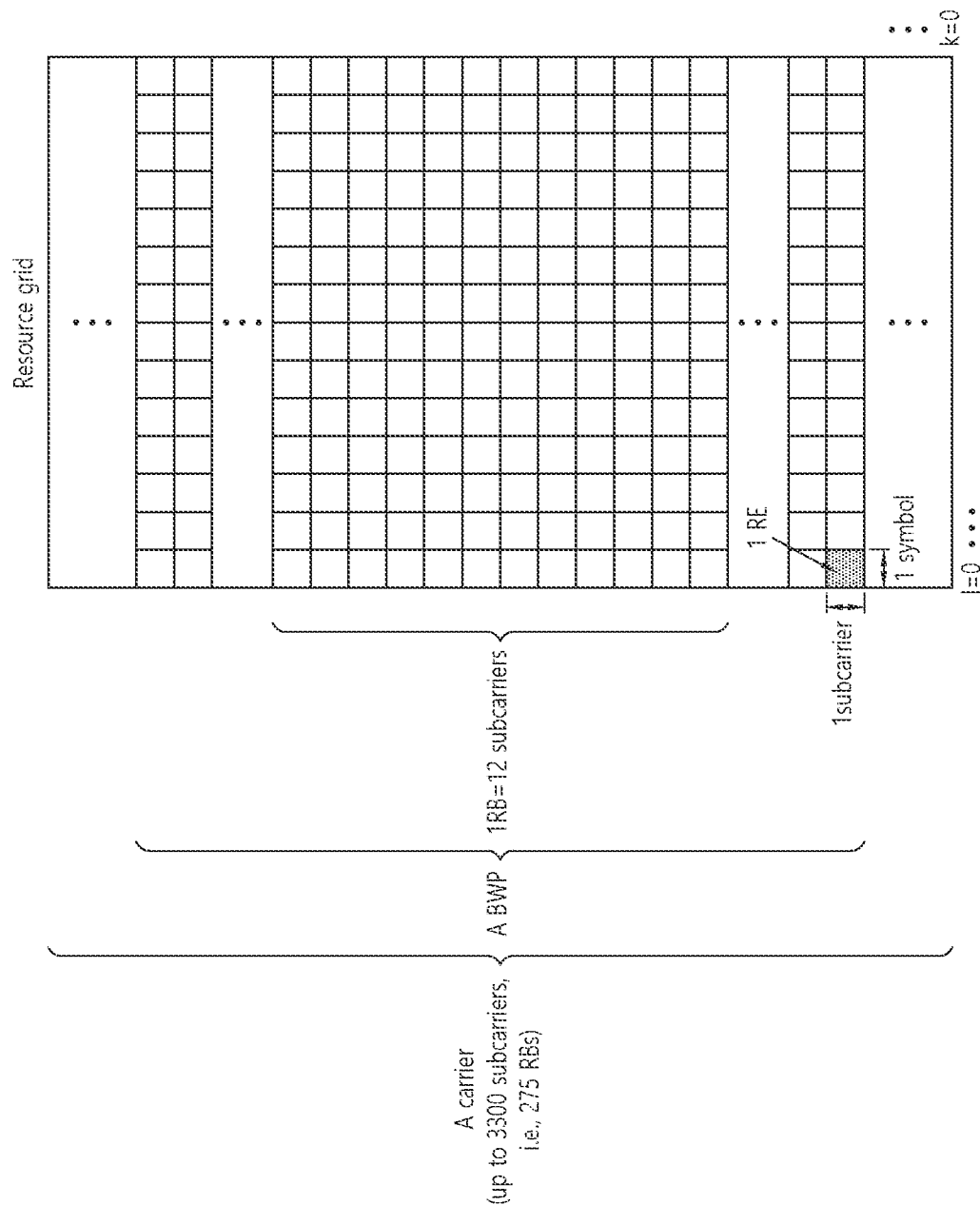
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial MWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared Channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saying, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
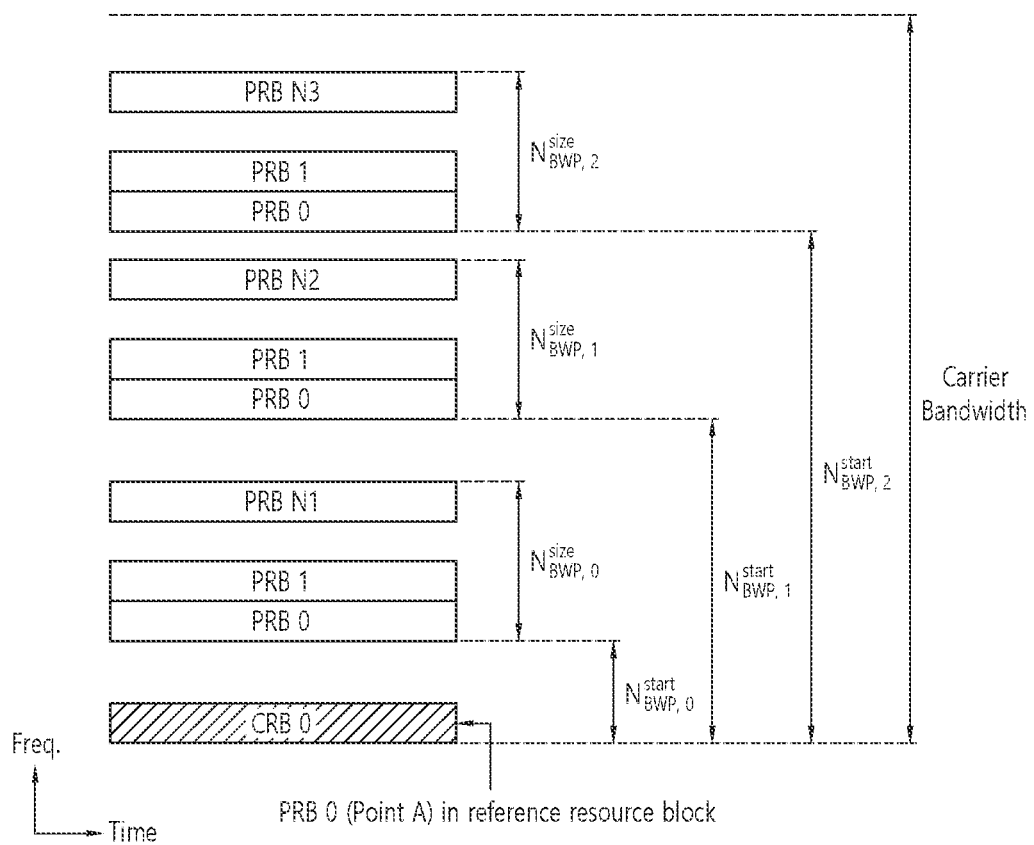
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
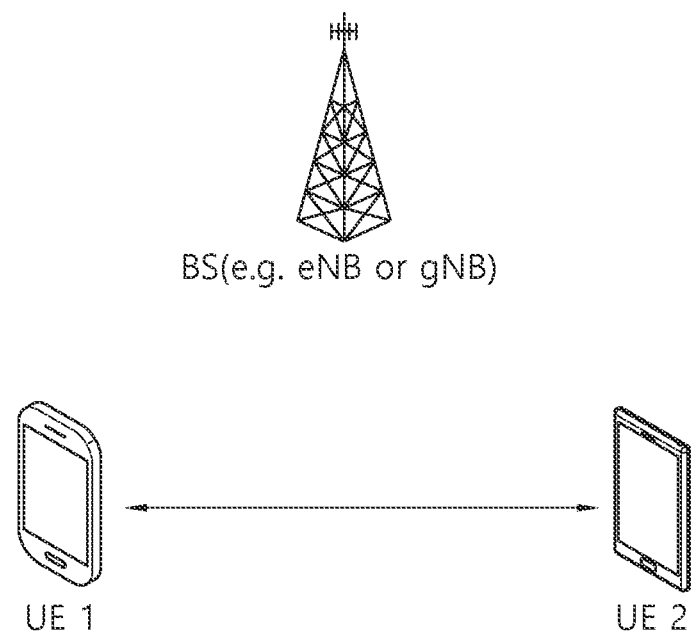
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term "UE" may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
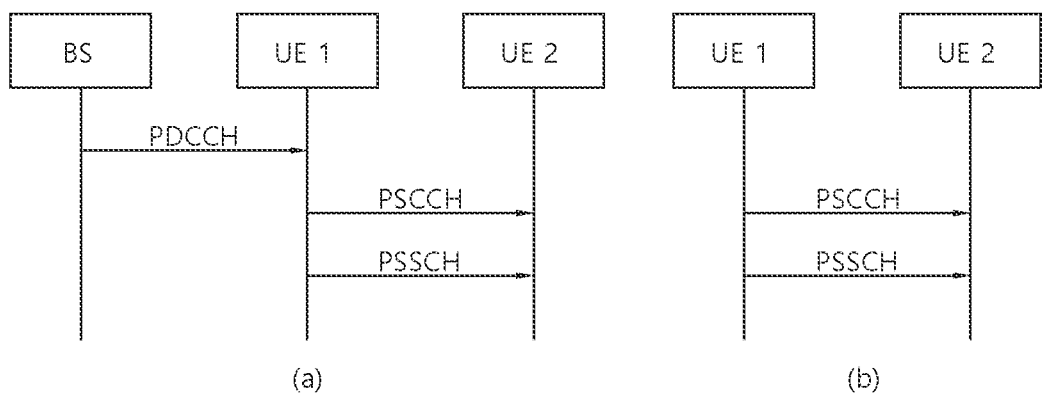
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously; selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
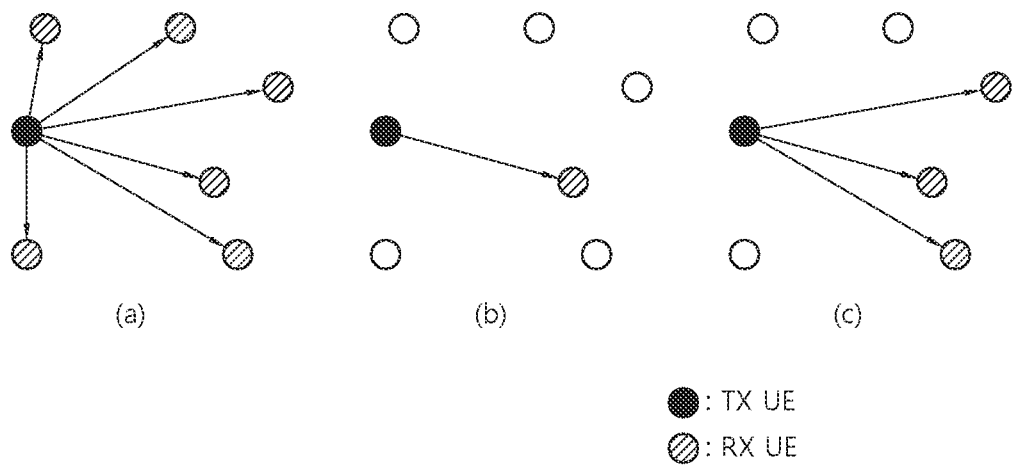
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

FIG. 10 shows a method in which a UE that has reserved transmission resource(s) informs another UE of the transmission resource(s), based on an embodiment of the present disclosure. The embodiment of FIG. 10 may be combined with various embodiments of the present disclosure.

Specifically, for example, (a) of FIG. 10 shows a method for performing by a transmitting UE chain-based resource reservation by transmitting/signaling location information of (maximum) 2 transmission resources to receiving UE(s) through one SCI, in the case of a value of K=4. For example, (b) of FIG. 10 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 10, the transmitting UE may transmit/signal only location information of the fourth transmission-related resource to the receiving UE(s) through the fourth (or last) transmission-related PSCCH. For example, referring to (a) of FIG. 10, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 10, the transmitting UE may transmit/signal to the receiving UE(s) not only location information of the fourth transmission-related resource but also location information of the second transmission-related resource and location information of the third transmission-related resource additionally through the fourth (or last) transmission-related. PSCCH. In this case, for example, in (a) and (b) of FIG. 10, if the transmitting UE may transmit/signal to the receiving UE(s) only location information of the fourth transmission-related resource through the fourth (or last) transmission-related PSCCH, the transmitting UE may set or designate a field/bit of location information of unused or remaining transmission resource(s) to a pre-configured value (e.g., 0). For example, in (a) and (b) of FIG. 10, if the transmitting UE may transmit/signal to the receiving UE(s) only location information of the fourth transmission-related resource through the fourth (or last) transmission-related PSCCH, the transmitting UE may be set or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 10 shows a method for performing by the transmitting UE block-based resource reservation, by signaling location information of 4 transmission resources to receiving UE(s) through one SCI, in the case of a value of K=4.

Figure 11:
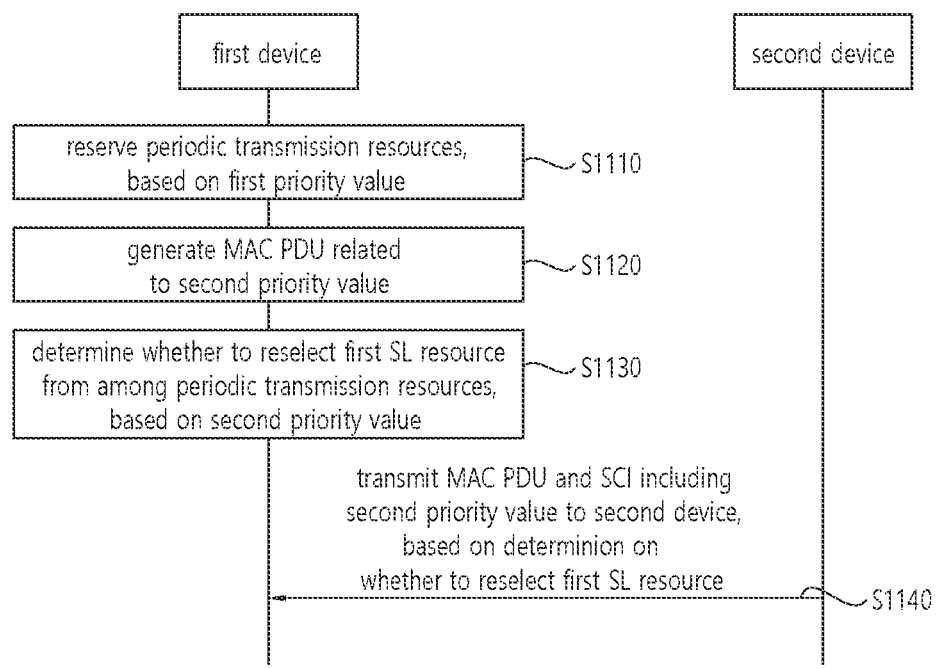
FIG. 11 shows a method in which a first device and a second device perform sidelink communication, according to an embodiment of the present disclosure.

FIG. 11 illustrates a method in which a first device and a second device perform sidelink communication, according to an embodiment of the present disclosure.

In step S1110, the first device according to an embodiment may reserve periodic transmission resources, based on a first priority value. In step S1120, the first device according to an embodiment may generate a medium access control (MAC) protocol data unit (PDU) related to a second priority value. In step S1130, the first device according to an embodiment may determine whether to reselect a first sidelink (SL) resource from among the periodic transmission resources, based on the second priority value. In step S1140, the first device according to an embodiment may transmit the MAC PDU and sidelink control information (SCI) including the second priority value to the second device, based on the determination on whether to reselect the first SL resource.

Hereinafter, embodiments and/or examples which may be directly or indirectly related to at least one of steps S1110 to S1140 will be reviewed. Meanwhile, since the embodiments and/or examples are related to only at least one of the steps S1110 to S1140, although the following embodiments and/or examples and at least one of the steps S1110 to S1140 are contrary to each other, it shall not be interpreted that the contradicted content departs from the scope of the present specification.

In case of a TX UE, when data is available on a sidelink (SL) logical channel (LCH) (and/or when data arrives at a buffer thereof), a sensing operation is performed based on priority (hereinafter, referred to as 'INI_PRIORITY') information of the data, and then it may be used to perform periodic resource reservation for transmission of a plurality of MAC PDUs. In this case, if it is assumed that the MAC PDU of INI_PRIORITY is also transmitted on a future (periodic) reservation resource and if whether there is a need to reselect the future (periodic) reservation resource is determined "in advance" based on re-evaluation and/or pre-emption checking, there may be a problem in that the future (periodic) reservation resource is unnecessarily reselected (i.e., there may be an increase in a probability of collision occurrence in selection/reservation resources between different UEs) (even if there is no need to reselect a resource since the MAC PDU to be transmitted in practice on the future (periodic) reservation resource has a priority different from INI_PRIORITY).

In some embodiments below, instead of performing the re-evaluation and/or pre-emption checking for the future (periodic) reservation resource by using the (aforementioned) INI_PRIORITY used in the periodic resource reservation for transmission of the plurality of MAC PDUs, priority (hereinafter, referred to as 'ACT_PRIORITY') information of the MAC PDU to be transmitted in practice on the future (periodic) reservation resource may be used to determine whether resource reselection is necessary based on the re-evaluation and/or pre-emption checking for the (future (periodic)) reservation resource. That is, INI_PRIORITY and ACT_PRIORITY may be different.

According to some embodiments below, whether it is necessary to reselect the future (periodic) reservation resource is accurately/effectively determined, thereby decreasing the probability of collision occurrence in the selection/reservation resources between the different UEs.

[Proposed method #1] For example, according to the condition/rule described in Table 5 below, pre-emption resource checking/determining (and/or pre-emption resource reselecting operation) may be performed. For example, it may be configured such that the pre-emption operation is performed, according to (some) rules below. For example, a parameter related to (some) proposed methods/rules of the present disclosure (e.g., [proposed method #1], [proposed method #2], [proposed method #3], [proposed method #4], [proposed method #5], [proposed method #6], [proposed method #7]) (and/or whether it is applied) may be set (and/or defined) differently (or independently) specifically (or separately) for service priority/type (and/or (service) QOS requirement (e.g., latency, reliability) and/or (resource pool) congestion level (e.g., channel busy ratio (CBR)) and/or resource pool and/or cast type (e.g., unicast (and/or groupcast and/or broadcast)) and/or HARQ feedback type (e.g., ACK/NACK feedback (and/or NACK only feedback)) and/or SL operation mode (e.g., mode 1, mode 2) and/or HARQ feedback enabled (or disabled) MAC PDU (and/or TB) and/or the (maximum or minimum or average) number of SL sessions (operated (or operable) by a terminal) and/or the maximum (or minimum or average) number of PSFCHs that can be simultaneously received/processed (or transmitted) by the terminal (e.g., UE capability) and/or (resource pool-related) PSFCH resource cycle and/or the (maximum or minimum or average) number of SL HARQ feedback bits/information amount transmitted through a (specific) PUCCH (and/or the (maximum or minimum or average) number of (last) PSFCH slots (related (feedback bundling) PSCCH slot) associated with the (specific) PUCCH and/or the (maximum or minimum or average) number of PSFCHs required to be received (simultaneously) (on the last PSFCH slot associated with the PUCCH) for PUCCH information configuration and/or a counter sidelink assignment index field value (on dynamic grant (DG) DCI)) and/or a (maximum or minimum or average) symbol count (and/or position) related to an SL slot (and/or PSSCH) (on the last PSFCH slot associated with the PUCCH) (in a resource pool) (and/or a PSFCH symbol count (and/or position) in the SL slot (on the last PSFCH slot associated with the PUCCH)) and/or (resource pool-related) (pre-set) PSSCH DMRS time domain pattern (and/or (selectable) PSSCH (time domain) DMRS (pattern) symbol maximum (or minimum or average) count and/or a DMRS symbol position/index in the last position in the SL slot among (selectable) PSSCH (time domain) DMRS (pattern) symbols) and/or whether SL CSI-RS (and/or PT-RS) is configured (in the resource pool) and/or a synchronization error between UU communication and SL communication (e.g., subframe (and/or slot and/or symbol) boundary difference, (start point) difference of SFN 0 and DFN 0) (and/or whether the synchronization error between UU communication and SL communication exceeds a pre-set acceptable) threshold) and/or PUCCH-related HARQ codebook type (e.g., semi-static codebook (and/or dynamic codebook)) and/or a PUSCH symbol count (and/or a DMRS symbol count/position on the PUSCH) by which the (PSFCH-related) PUCCH is piggybacked and/or mode 1 dynamic grant (or configured grant) and/or (PSFCH) SL numerology (e.g., sub-carrier spacing, CP length/type) (and/or (PUCCH) UL numerology and/or a minimum value between SL, numerology and UL numerology and/or combination between SL numerology and UL numerology) and/or whether it is in an RRC connection (and/or (RRC) idle) state (with respect to a base station/network) and/or whether it is periodic resource reservation).

Table 5 below shows some embodiments regarding reselection of an SL resource.

TABLE 5

Agreements:
Finalize the RRC parameter for pre-emption activation per resource pool by
 • Disabled
 • Enabled. Default is without a priority level (i.e., pre-emption is applicable to all levels).
  ○ Can optionally configuring a priority level p_preemption {1... 8} (the value range
   is a working assumption), and (as a working assumption regarding "<") if prioRX

TABLE 5-continued

<p_preemption, and prioTX> prioRX, then pre-emption can be triggered
✓ Note: In the inequalities it is assumed that the lowest priority value
corresponds to the highest priority/importance traffic
✓ prioRX is the priority associated with the resource indicated in SCI, as per
8.1.4 in 38.2.14
✓ prioTX is L1 priority within a UE associated with the reserved resources, as
per 8.1.4 in 38.214

Agreements:
• The procedure to check whether a reserved resource to be signaled in slot 'm' should be re-
selected due to pre-emption:
  ○ A regular Step 1 (as in 8.1.4 in 38.214) of the resource (re-)selection procedure is
    performed
  ○ If the reserved resource is still in the identified candidate resource set after the Step 1
    execution, then Step 2 for reselection of die reserved resource(s) is not triggered
  ○ If the reserved resource is NOT in the identified candidate resource set after the
    Step 1 execution
    ✓ If the resource is excluded by comparison with the RSRP measurement for an
      SCI associated with a priority which can trigger pre-emption, then Step 2 for
      reselection of the reserved resource(s) is triggered
    ✓ If the resource is excluded by comparison with the RSRP measurement for an
      SCI associated with a priority which cannot digger pre-emption, then Step 2
      for reselection of the reserved resource(s) is not triggered Agreements:
• Once pre-emption re-selection condition is met at the UE, re-selection is performed for all
  resources which satisfy the pre-emption re-selection condition
  ○ A UE ensures the HARQ RTT related minimum time gap Z agreed in RAN1#100-e,
    between re-selected and non-preempted resources during the re-selection
    triggered by pre-emption
  ○ FFS cases when timing restriction could not be met
  ○ FFS whether/how to extend it to periodic reservations

[Rule 1-1] For example, even if a (future) resource is reserved through SCI signaling (of a previous/past time) (hereinafter, for convenience of explanation, the (future) reserved resource is referred to as "RSV_RSC"), at a time where a MAC PDU (and/or TB) to be transmitted through the RSV_RSC is not generated (in a MAC layer), and/or a time where it is not transferred (from the MAC layer) to a PHY layer, and/or a time where ((configured SL grant)-associated) logical channel (LCH)-related data to be transmitted through the RSV_RSC is not present:

it may be configured to exclude the RSV_RSC from a (candidate) target of determination/consideration of whether it is a pre-emption resource, and/or (top) priority information (related to existing MAC PDU (and/or TB) and/or ((configured SL grant)-associated) LCH (data)) when SCI signaling (of (oldest or latest) past time) for RSV_RSC reservation is performed may be configured to be used to determine whether it is pre-eruption for the RSV_RSC, and/or priority information related to a MAC PDU (and/or TB and/or ((configured SL grant-associated) (top priority) LCH (data)) transmitted at the latest (and/or oldest and/or before a pre-set time offset) past time may be configured to be used to determine whether it is a pre-emption (resource) for RSV_RSC, and/or (top) priority information (related to existing MAC PDU (and/or TB) and/or ((configured SL grant)-associated) LCH (data)) when RSV_RSC-related resource sensing (and/or resource selection) is performed may be configured to be used to determine whether it is a pre-emption (resource) for the RSV_RSC, and/or priority information assumed for a reservation resource such as RSV_RSC may be configured (in advance) from a base station/network (specifically for a resource pool (and/or service type/priority and/or QOS requirement (e.g., latency, reliability))), and/or top priority information of ((configured SL grant)-associated) LCH related to data (and/or MAC PDU and/or TB) that can be transmitted through an RSV_RSC resource may be configured to be used to determine whether it is a pre-emption (resource) for the RSV_RSC, and/or it may be configured to include the RSV_RSC in a (candidate) target of determination/consideration of whether it is a pre-emption (resource), only when a MAC PDU (and/or TB and/or LCH-related data) to be transmitted through the RSV_RSC is present (and/or when it is transferred (from a MAC layer) to a PHY layer).

In addition, for example, (the aforementioned) [rule 1-1] may be applied limitedly only when PSCCH/PSSCH transmission based on (mode 2) periodic (and/or aperiodic) resource reservation (and/or based on a (mode 1) CG resource) is performed.

[Proposed method #2] For example, it may be configured such that a re-evaluation operation is performed, according to (some) rules below. In addition, for example, [rule 2-1] (below) may be applied limitedly only when PSCCH/PSSCH based on (mode 2) periodic (and/or aperiodic) resource reservation and/or based on (mode 1) CG resource) is performed.

[Rule 2-1] For example, even if a transmission resource is selected (from a selectable candidate resource set (with small interference) based on sensing) in a selection window (e.g., for convenience of explanation, the selected resource is referred to as "SEL_RSC"), at a time where a MAC PDU (and/or TB) to be transmitted through the SEL_RSC is not generated (in a MAC layer), and/or a time where it is not transferred (from the MAC layer) to a PHY layer, and/or a time where ((configured SL grant)-associated) logical channel (LCH)-related data to be transmitted through the SEL_RSC is not present:

it may be configured to exclude the SEL_RSC from a re-evaluation (candidate) target, and/or (top) priority information at a previous (nearest) time at which SCI signaling is performed (SEL_RSC) may be configured to be used to re-evaluate the SEL_RSC. For example, (top) priority information (related to MAC PDU (and/or TB) and/or ((configured SL grant)-associated) LCH (data)) existing at the previous (nearest) time at which SCI signaling is performed (SEL_RSC) may be configured to be used to re-evaluate the SEL_RSC, and/or (top) priority information (related to existing MAC PDU (and/or TB) and/or ((configured SL grant)-associated) LCH (data)) when SEL_RSC-related resource sensing (and/or resource selection) is performed may be configured to be used to re-evaluate the SEL_RSC, and/or priority information assumed for a selection resource such as SEL_RSC may be configured (in advance) from a base station/network (specifically for a resource pool (and/or service type/priority and/or QOS requirement (e.g., latency, reliability))), and/or top priority information of ((configured SL grant)-associated) LCH related to data (and/or MAC PDU and/or TB) that can be transmitted through a SEL_RSC resource may be configured to be used to re-evaluate the SEL_RSC, and/or it may be configured to include the SEL_RSC in a re-evaluation (candidate) target, only when a MAC PDU (and/or TB and/or LCH-related data) to be transmitted through the SEL_RSC is present (and/or when it is transferred (from a MAC layer) to a PHY layer).

[Proposed method #3] For example, when a TX UE performs (PSSCH (and/or PSCCH)) transmission multiple times for the same (HARQ enabled) TB (and/or MAC PDU) on a PSSCH (and/or PSCCH) slot (hereinafter, referred to as BUN_SLOWIN) associated with a PSFCH slot (HARQ bundling), an RX UE may be allowed to generate/determine SL HARQ feedback information, based on a PSSCH (and/or PSCCH) received last within the BUN_SLOWIN (implicitly). For example, the RX UE may perform HARQ combining on a plurality of PSSCHs received for the same HARQ enabled TB (and/or MAC PDU) to determine/decide whether data reception is finally successful (e.g., ACK or NACK), and may report this to the TXC UE through (one-time) PSFCH transmission. Herein, for example, a PSFCH resource index/position used to report SL HARQ feedback information of the RX UE may be determined as a parameter (e.g., a slot index, a start subchannel index (and/or the total number of subchannels), (L1 or L2) source ID, etc.) related to a PSSCH (and/or PSCCH) received last (or first) within the BUN_SLOWIN. In addition, for example, when a base station schedules a plurality of resources (and/or a plurality of resources related to one DG) within (one) CG resource period, on the BUN_SLOWIN, a mode 1 TX UE may be allowed to retransmit the same (HARQ enabled) TB (and/or MAC PDU) (without blind or HARQ feedback reception), with the plurality of resources, within the BUN_SLOWIN (implicitly). For example, it may be interpreted that, in case of the HARQ enabled MAC PDU, the same MAC PDU is retransmitted without having to receive SL HARQ feedback for a PSCCH (and/or PSCCH) transmitted first within the BUN_SLOWIN.

TABLE 6

Agreements:
- It is up to UE implementation to reselect any pre-selected but not reserved resource which is still in the identified resource set after Step 1 in order to ensure the timing restrictions during reselection triggered by re-evaluation and/or pre-emption
  ○ The timing restrictions at least include the HARQ RTT related minimum gap Z agreed in RAN1#100e
  ○ FFS how to handle the case that there is no resources satisfying the timing restrictions in the identified resource set after Step 1 (CASE B)

Agreements:
- Once pre-emption re-selection condition is met at the UE, re-selection is performed for all resources which satisfy the pre-emption re-selection condition
  ○ A UE ensures the HARQ RTT related minimum time gap Z agreed in RAN1#100-e, between re-selected and non-preempted resources during the re-selection triggered by pre-emption
  ○ FFS cases when timing restriction could not be met (CASE A)
  ○ FFS whether/how to extend it to periodic reservations Agreements:
- In Step 2, a UE should/shall select resources so that HARQ retransmission resources can be reserved by a prior SCI, except that
  ○ In case no resource can be found for reservation (e.g., based on the identified candidate set after Step 1) for a retransmission of a TB, the re-transmission can be transmitted on a resource that is not reserved (CASE C)
  ○ After the resource selection is performed, HARQ retransmission on a resource not reserved by a prior SCI is allowed due to transmission dropping caused by prioritization, pre-emption and congestion control (CASE D)
  ○ To discuss and conclude "should vs. shall" in RAN1#101

[Proposed method #4] In an embodiment, in case of the CASE A on the Table 6 above, it may be configured such that reselection of a resource which does not satisfy an HARQ RTT-related timing restriction (with respect to a (non-pre-empted) resource to be not subjected to resource reselection) is exceptionally possible/allowed. Additionally/alternatively, when a resource to be reserved as SCI on another resource (not subjected to resource reselection) (at a previous time) is reselected, it may be configured such that reselection of a resource is (limitedly) performed within a time domain in which a corresponding reservation is (maintainable) available. Additionally/alternatively, it may be configured such that resource reselection is (exceptionally) allowed irrespective of whether corresponding reservation is maintainable/available.

Herein, for example, the (aforementioned) resource to be reselected may be selected (limitedly) from a candidate resource (selectable based on sensing (or STEP 1)) existing on a slot different from a (non-preempted) resource reserved (in advance) with SCI.

Herein, for example, when the above rule is applied, it may be configured such that only an HARQ disabled MAC PDU (or a new MAC PDU) is transmitted through a reselected resource (and/or a (non-preempted) resource to be not subjected to resource reselection related to the reselected resource (in terms of the HARQ RTT timing restriction)), and/or may be configured such that an HARQ feedback request field on related SCI is disabled even if the HARQ enabled MAC PDU is transmitted through such a resource.

In another embodiment, in case of the CASE A on the Table 6 above, it may be configured such that reselection of a resource triggered for reselection is omitted/interrupted (for example, it may be interpreted that a transmission opportunity is missed/omitted).

Herein, for example, when the above rule is applied, it may be configured such that only an HARQ disabled MAC PDU (or a new MAC PDU) is transmitted through a (non-preempted) resource to be not subjected to resource reselection related to a resource of which reselection is omitted/interrupted (in terms of the HARQ RTT timing restriction), and/or may be configured such that an HARQ feedback request field on related SCI is disabled even if the HARQ enabled MAC PDU is transmitted through such a resource.

In another embodiment, in case of the CASE A on the Table 6 above, it may be configured such that all (reservation) resources at a time after a resource triggered for corresponding reselection is included are to be reselected (and/or configured such that an SL grant related to the resource triggered for the corresponding reselection is cleared and (all) resources are to be newly reselected).

[Proposed Method #5] In an embodiment, in case of the CASE B on the table below, it may be configured such that reselection of a resource which does not satisfy an HARQ RTT related timing restriction (with respect to the previously selected resource) is exceptionally possible/allowed. Additionally/alternatively, when a resource to be reserved with SCI on another selected resource (of a previous time) is reselected, it may be configured such that reselection of a resource is (limitedly) performed within a time domain in which a corresponding reservation is (maintainable) available (and/or resource reselection is (exceptionally) allowed irrespective of whether whether corresponding reservation is maintainable/available).

Herein, for example, when the above rule is applied, it may be configured such that only an HARQ disable MAC PDU (or a new MAC PDU) is transmitted through a reselected resource (and/or a (selection) resource which does not maintain an HARQ RTT timing restriction with reselect to the reselected resource), and/or may be configured such that an HARQ feedback request field on related. SCI is disabled even if the HARQ enabled MAC PDU is transmitted through such a (selection) resource.

In another embodiment, in case of the CASE B on the table below, it may be configured such that all (selection) resources at a time after a resource to be subjected to corresponding reselection is included are to be reselected. Additionally/alternatively, it may be configured such that an SL grant related to the resource subjected to the corresponding reselection is cleared and (all) resources are to be newly reselected.

[Proposed method #6] In an embodiment, in case of the CASE D on the table below, when (HARQ) retransmission is performed through a resource not reserved with SCI (of a previous time), such a resource may be selected (limitedly) from a candidate resource (selectable based on sensing (or STEP 1)) existing on a slot different from a resource reserved (in advance) with SCI (or a resource selected in advance (within a selection window)).

[Proposed method #7] In an embodiment, in case of the CASE C on the table below, it may be configured such that reselection of all resources (including a resource selected in advance) is triggered (until a condition is satisfied in which reservation is available with SCI of a previous time between (all) selected resources). Herein, for example, the (maximum) (allowed) number of times of triggering a corresponding reselection operation (of all resources) may be set (and/or defined) differently (or independently) specifically for service priority/type and/or QOS requirement (e.g., latency, reliability) and/or (resource pool) congestion level.

Figure 12:
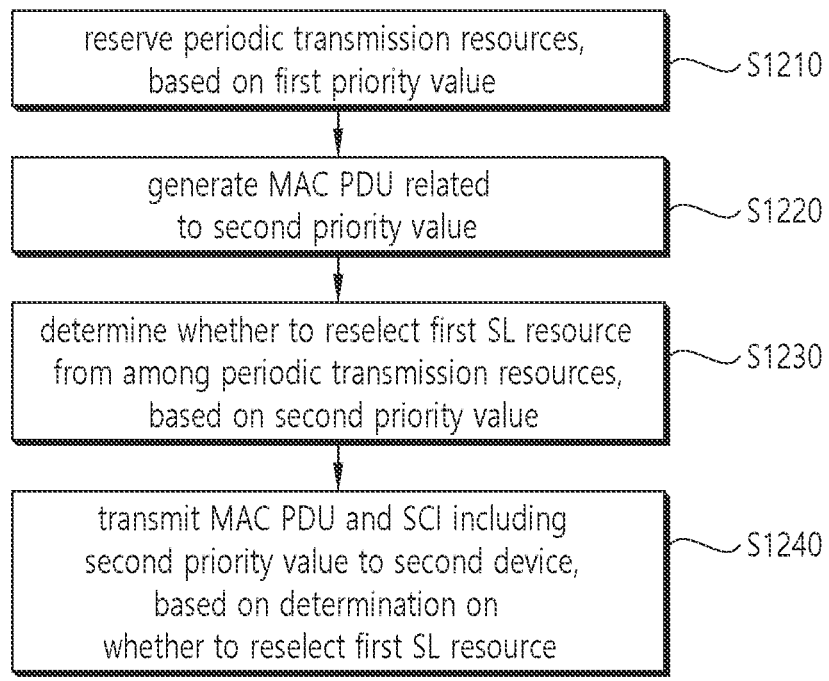
FIG. 12 is a flowchart illustrating a method for a first device to perform sidelink communication according to an embodiment of the present disclosure.

FIG. 12 is a flowchart illustrating a method in which a first device performs SL communication according to an embodiment of the present disclosure.

Operations described in the flowchart of FIG. 12 may be performed in combination with various embodiments of the present disclosure. In an example, the operations disclosed in the flowchart of FIG. 12 may be performed based on at least one of the devices illustrated in FIG. 14 to FIG. 19. In an example, the first device of FIG. 12 may correspond to the first wireless device 100 of FIG. 15, and the second device may correspond to the second wireless device 200 of FIG. 15. In another example, the first device of FIG. 12 may correspond to the second wireless device 200 of FIG. 15, and the second device may correspond to the first wireless device 100.

In step S1210, the first device according to an embodiment may reserve periodic transmission resources, based on a first priority value.

In step S1220, the first device according to an embodiment may generate a medium access control (MAC) protocol data unit (PDU) related to a second priority value.

In step S1230, the first device according to an embodiment may determine whether to reselect a first sidelink (SL) resource from among the periodic transmission resources, based on the second priority value.

In step S1240, the first device according to an embodiment may transmit the MAC PDU and sidelink control information (SCI) including the second priority value to the second device, based on the determination on whether to reselect the first SL resource.

In an embodiment, the first SL resource may be at least one SL resource after a time at which the MAC PDU is generated.

In an embodiment, a time at which the second priority value is transferred from a MAC layer of the first device to a physical (PHY) layer may be before a start time of the first SL resource.

In an embodiment, the transmitting of the MAC PDU and the SCI including the second priority value may further include transmitting the MAC PDU and the SCI including the second priority value to the MAC PDU through a second SL resource among the periodic transmission resources, based on the determination on that the first SL resource is to be reselected.

In an embodiment, the transmitting of the MAC PDU and the SCI including the second priority value may further include transmitting the MAC PDU and the SCI including the second priority value through the first SL resource, based on the determination on that the first SL resource is not to be reselected.

In an embodiment, the first device may transmit SCI including the first priority value to the second device, based on a third SL resource among the periodic transmission resources.

In an embodiment, whether to reselect the first SL resource may be determined based on determination on whether pre-emption is applied to the first SL resource.

In an embodiment, it may be determined that the pre-emption is applied to the first SL resource, based on that the second priority value is greater than a third priority value included in SCI received by the first device.

In an embodiment, whether to reselect the first SL resource may be determined, based on determination on whether re-evaluation is applied to the first SL resource.

In an embodiment, the second priority value may be a layer 1 (L1) priority value related to the MAC PDU.

According to an embodiment of the present disclosure, there may be provided a first device performing sidelink communication. The first device may include at least one memory storing instructions, at least one transceiver, and at least one processor connecting the at least one memory and the at least one transceiver. The at least one processor may control the at least one transceiver to reserve periodic transmission resources, based on a first priority value, generate a MAC PDU related to a second priority value, determine whether to reselect a first SL resource from among the periodic transmission resources, based on the second priority value; and transmit the MAC PDU and SCI including the second priority value to a second device, based on the determination on whether to reselect the first SL resource. The first SL resource may be at least one SL resource after a time at which the MAC PDU is generated.

According to an embodiment of the present disclosure, there may be provided a device (or chip(set)) controlling a first terminal. The device may include at least one processor and at least one computer memory operably connected by the at least one processor and storing instructions. The at least one processor may execute the instructions, causing the first device to reserve periodic transmission resources, based on a first priority value, generate a MAC PDU related to a second priority value; determine whether to reselect a first SL resource from among the periodic transmission resources, based on the second priority value, and transmit the MAC PDU and SCI including the second priority value to a second device, based on the determination on whether to reselect the first SL resource. The first SL resource may be at least one SL resource after a time at which the MAC PDU is generated.

In an embodiment, the first terminal of the embodiment may represent the first device described throughout the present disclosure. In an embodiment, the at least one processor, at least one memory, or die like in the device for controlling the first terminal may be implemented as respective separate sub chips, or at least two or more components may be implemented through one sub chip.

According to an embodiment of the present disclosure, there may be provided a non-transitory computer-readable storage medium having instructions (or indications) stored thereon. The non-transitory computer readable storage medium, when the instructions are executed, may cause a first device to: reserve periodic transmission resources, based on a first priority value; generate a medium access control (MAC) protocol data unit (PDU) related to a second priority value; determine whether to reselect a first sidelink (SL) resource from among the periodic transmission resources, based on the second priority value, and transmit the MAC PDU and sidelink control information (SCI) including the second priority value to a second device, based on the determination on whether to reselect the first SL resource. The first SL resource may be at least one SL resource after a time at which the MAC PDU is generated.

Figure 13:
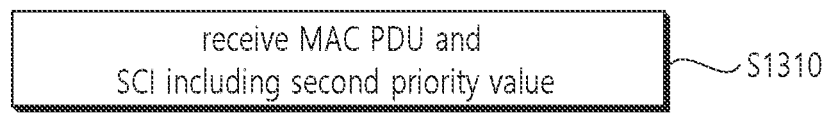
FIG. 13 is a flowchart illustrating a method for a second device to perform sidelink communication according to an embodiment of the present disclosure.

FIG. 13 is a flowchart illustrating an operation of a second device according to an embodiment of the present disclosure.

Operations disclosed in the flowchart of FIG. 13 may be performed in combination with various embodiments of the present disclosure. In an embodiment, the operations disclosed in the flowchart of FIG. 13 may be performed based on at least one of devices illustrated in FIG. 14 to FIG. 19. In an example, the second device of FIG. 13 may correspond to the second wireless device 200 of FIG. 16, and the first device may correspond to the first wireless device 100 of FIG. 15. In another example, the second device of FIG. 13 may correspond to the first wireless device 100 of FIG. 15, and the first device may correspond to the second wireless device 200.

The first device according to an embodiment may reserve periodic transmission resources, based on a first priority value.

The first device according to an embodiment may generate a medium access control (MAC) protocol data unit (PDU) related to a second priority value.

The first device according to an embodiment may determine whether to reselect first sidelink (SL) resource from among the periodic transmission resources, based on the second priority value.

In step S1310, the second device according to an embodiment may receive a MAC PDU and SCI including the second priority value.

In an embodiment, the first SL resource may be at least one SL resource after a time at which the MAC PDU is generated.

In an embodiment, a time at which the second priority value is transferred from a MAC layer of the first device to a physical (PHY) layer may be before a start time of the first SL resource.

In an embodiment, the transmitting of the MAC PDU and the SCI including the second priority value may further include transmitting the MAC PDU and the SCI including the second priority value to the MAC PDU through a second SL resource among the periodic transmission resources, based on the determination on that the first SL resource is to be reselected.

In an embodiment, the transmitting of the MAC PDU and the SCI including the second priority value may further include transmitting the MAC PDU and the SCI including the second priority value through the first SL resource, based on the determination on that the first SL resource is not to be reselected.

In an embodiment, the first device may transmit SCI including the first priority value to the second device, based on a third SL resource among the periodic transmission resources.

In an embodiment, whether to reselect the first SL resource may be determined based on determination on whether pre-emption is applied to the first SL resource.

In an embodiment, it may be determined that the pre-emption is applied to the first SL resource, based on that the second priority value is greater than a third priority value included in SCI received by the first device.

In an embodiment, whether to reselect the first SL resource may be determined, based on determination on whether re-evaluation is applied to the first SL, resource.

In an embodiment, the second priority value may be a layer 1 (L1) priority value related to the MAC PDU.

According to an embodiment of the present disclosure, there may be provided a second device performing sidelink communication. The second device may include at least one memory storing instructions, at least one transceiver, and at least one processor connecting the at least one memory and the at least one transceiver. The at least one processor may control the at least one transceiver to receive a MAC PDU and SCI including the second priority value.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 14:
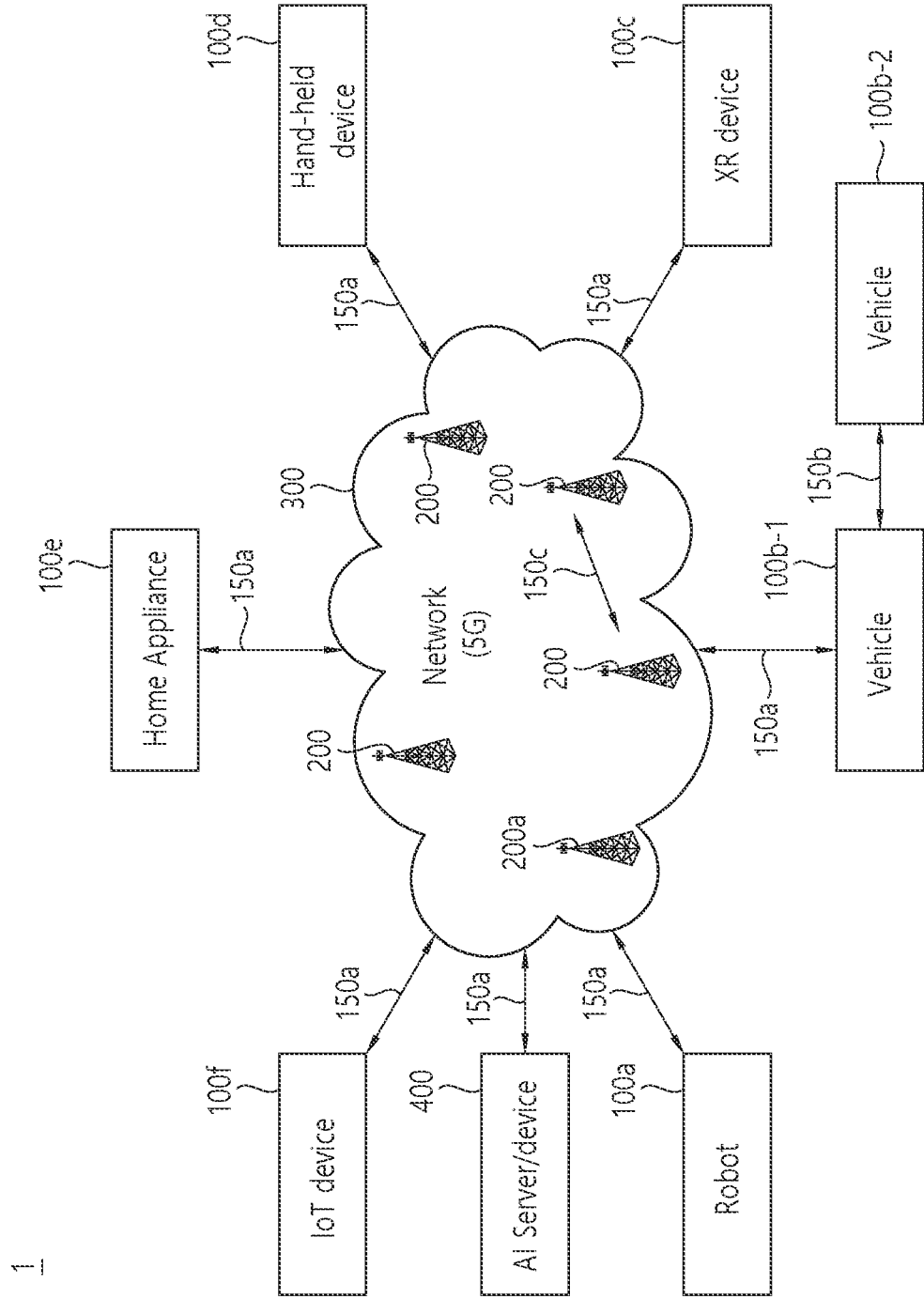
FIG. 14 shows a communication system 1, based on an embodiment of the present disclosure.

FIG. 14 shows a communication system 1, based on an embodiment of the present disclosure.

Referring to FIG. 14, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, air eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed, Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited. (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LIE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
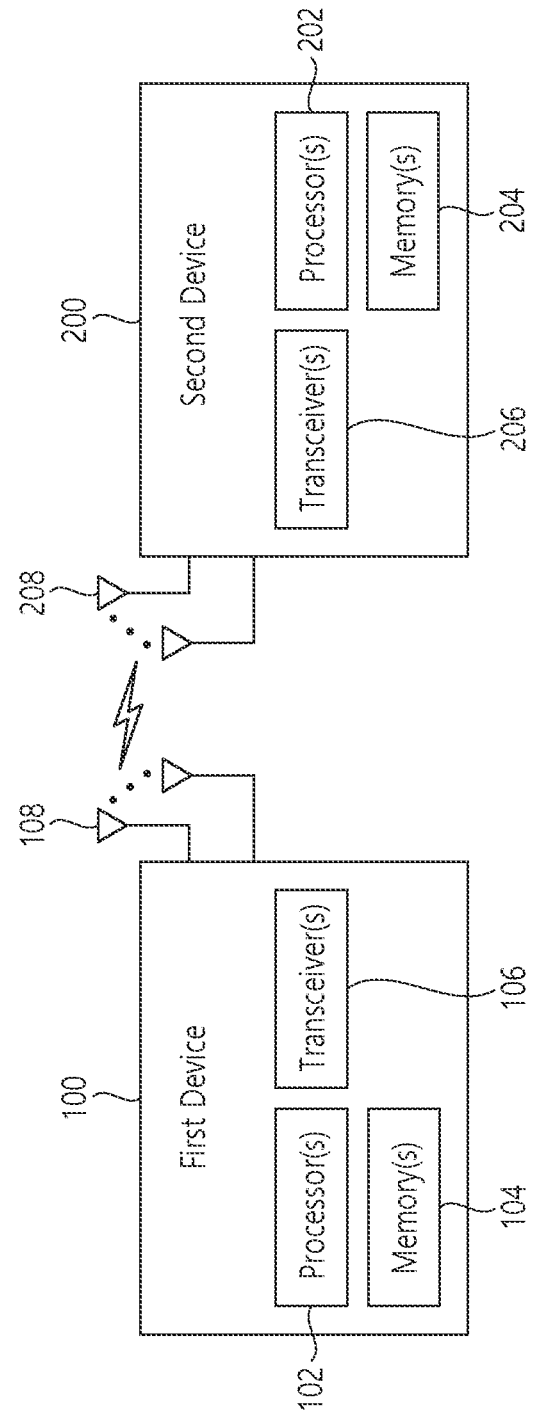
FIG. 15 shows wireless devices, based on an embodiment of the present disclosure.

FIG. 15 shows wireless devices, based on an embodiment of the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceivers) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceivers) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/ circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs). Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
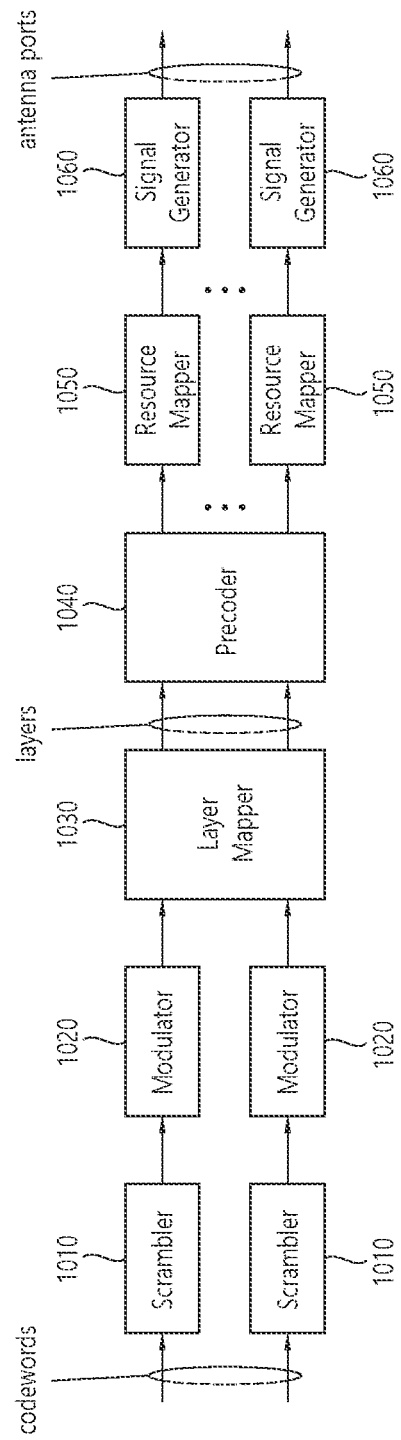
FIG. 16 shows a signal process circuit for a transmission signal, based on an embodiment of the present disclosure.

FIG. 16 shows a signal process circuit for a transmission signal, based on an embodiment of the present disclosure.

Referring to FIG. 16, a signal processing circuit 1000 may include scramblers 1010, modulators 1020, a layer mapper 1030, a precoder 1040, resource mappers 1050, and signal generators 1060. An operation/function of FIG. 16 may be performed, without being limited to, the processors 102 and 202 and/or the transceivers 106 and 206 of FIG. 15. Hardware elements of FIG. 16 may be implemented by the processors 102 and 202 and/or the transceivers 106 and 206 of FIG. 15. For example, blocks 1010 to 1060 may be implemented by the processors 102 and 202 of FIG. 15. Alternatively, the blocks 1010 to 1050 may be implemented by the processors 102 and 202 of FIG. 15 and the block 1060 may be implemented by the transceivers 106 and 206 of FIG. 15.

Codewords may be converted into radio signals via the signal processing circuit 1000 of FIG. 16. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), in-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFTT) modules. Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 16. For example, the wireless devices (e.g., 100 and 200 of FIG. 15) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 17:
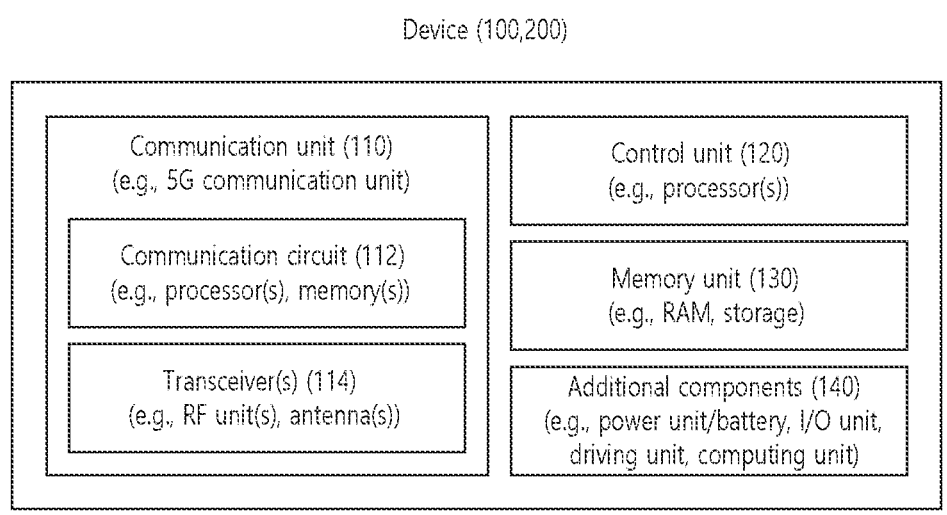
FIG. 17 shows another example of a wireless device, based on an embodiment of the present disclosure.

FIG. 17 shows another example of a wireless device, based on an embodiment of the present disclosure. The wireless device may be implemented in various forms according to a use-case/service (refer to FIG. 14).

Referring to FIG. 17, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 17 will be described in detail with reference to the drawings.

Figure 18:
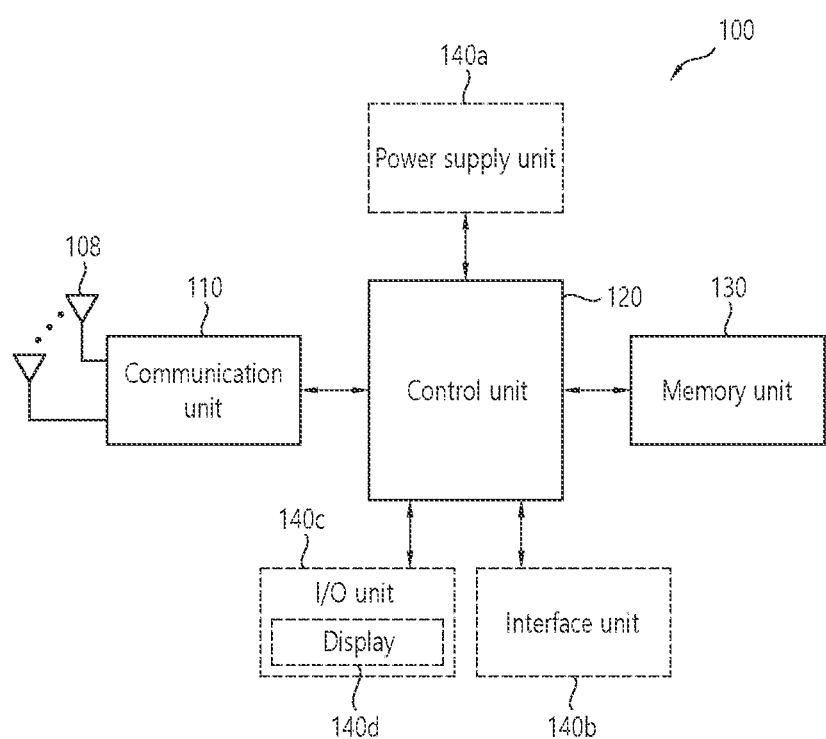
FIG. 18 shows a hand-held device, based on an embodiment of the present disclosure.

FIG. 18 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 18, a hand-held device 100 may include an antenna unit 108, a communication unit 110, a control unit 120, a memory unit 130, a power supply unit 140a an interface unit 140b, and an I/O unit 140c. The antenna unit 108 may be configured as a part of the communication unit 110. Blocks 110 to 130/140a to 140c correspond to the blocks 110 to 130/140 of FIG. 17, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 19:
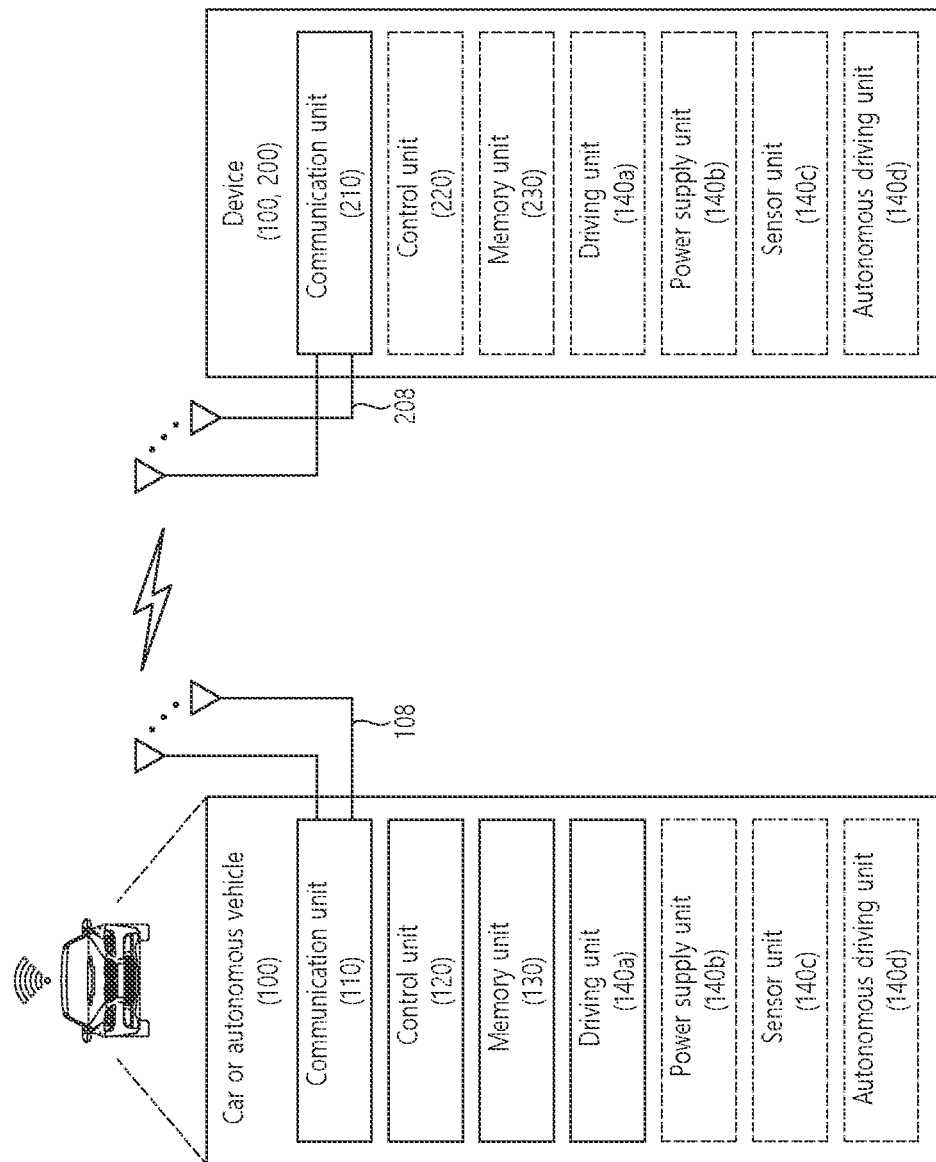
FIG. 19 shows a vehicle or an autonomous vehicle, based on an embodiment of the present disclosure.

FIG. 19 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 19, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 17, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing sidelink communication by a first device, the method comprising:
    reserving periodic transmission resources, based on a first priority value;
    generating a medium access control (MAC) protocol data unit (PDU) related to a second priority value;
    determining whether to reselect a first sidelink (SL) resource from among the periodic transmission resources, based on the second priority value; and
    transmitting the MAC PDU and sidelink control information (SCI) including the second priority value to a second device, based on the determination on whether to reselect the first SL resource,
    wherein the first SL resource is at least one SL resource after a time at which the MAC PDU is generated.

2. The method of claim 1, wherein a time at which the second priority value is transferred from a MAC layer of the first device to a physical (PHY) layer is before a start time of the first SL resource.

3. The method of claim 1, wherein the transmitting of the MAC PDU and the SCI including the second priority value further comprises transmitting the MAC PDU and the SCI including the second priority value to the MAC PDU through a second SL resource among the periodic transmission resources, based on the determination on that the first SL resource is to be reselected.

4. The method of claim 1, wherein the transmitting of the MAC PDU and the SCI including the second priority value further comprises transmitting the MAC PDU and the SCI including the second priority value through the first SL resource, based on the determination on that the first SL resource is not to be reselected.

5. The method of claim 1, further comprising:
    transmitting SCI including the first priority value to the second device, based on a third SL resource among the periodic transmission resources.

6. The method of claim 5, wherein whether to reselect the first SL resource is determined based on determination on whether pre-emption is applied to the first SL resource.

7. The method of claim 6, wherein it is determined that the pre-emption is applied to the first SL resource, based on that the second priority value is greater than a third priority value included in SCI received by the first device.

8. The method of claim 1, wherein whether to reselect the first SL resource is determined, based on determination on whether re-evaluation is applied to the first SL resource.

9. The method of claim 1, wherein the second priority value is a layer 1 (L1) priority value related to the MAC PDU.

10. A first device adapted to perform sidelink communication, the first device comprising:
    at least one memory storing instructions;
    at least one transceiver; and
    at least one processor connecting the at least one memory and the at least one transceiver, wherein the at least one processor executes the instructions to:
    reserve periodic transmission resources, based on a first priority value;
    generate a medium access control (MAC) protocol data unit (PDU) related to a second priority value;
    determine whether to reselect a first sidelink (SL) resource from among the periodic transmission resources, based on the second priority value; and
    control the at least one processor to transmit the MAC PDU and sidelink control information (SCI) including the second priority value to a second device, based on the determination on whether to reselect the first SL resource,
    wherein the first SL resource is at least one SL resource after a time at which the MAC PDU is generated.

11. The first device of claim 10, wherein a time at which the second priority value is transferred from a MAC layer of the first device to a physical (PHY) layer is before a start time of the first SL resource.

12. The first device of claim 10, wherein the at least one processor further executes the instructions to control the at least one transceiver to transmit the MAC PDU and the SCI including the second priority value to the MAC PDU through a second SL resource among the periodic transmission resources, based on the determination on that the first SL resource is to be reselected.

13. A processing device adapted to control a first device, the processing device comprising:
    at least one processor; and
    at least one computer memory operably connected by the at least one processor and storing instructions, wherein the at least one processor executes the instructions to:
    reserve periodic transmission resources, based on a first priority value;
    generate a medium access control (MAC) protocol data unit (PDU) related to a second priority value;

determine whether to reselect a first sidelink (SL) resource from among the periodic transmission resources, based on the second priority value; and transmit the MAC PDU and sidelink control information (SCI) including the second priority value to a second device, based on the determination on whether to reselect the first SL resource, wherein the first SL resource is at least one SL resource after a time at which the MAC PDU is generated.

14. The processing device of claim 13, wherein a time at which the second priority value is transferred from a MAC layer of the first device to a physical (PHY) layer is before a start time of the first SL resource.

15. The processing device of claim 13, wherein the transmitting of the MAC PDU and the SCI including the second priority value further comprises transmitting the MAC PDU and the SCI including the second priority value to the MAC PDU through a second SL resource among the periodic transmission resources, based on the determination on that the first SL resource is to be reselected.

16. The processing device of claim 13, wherein the transmitting of the MAC PDU and the SCI including the second priority value further comprises transmitting the MAC PDU and the SCI including the second priority value through the first SL resource, based on the determination on that the first SL resource is not to be reselected.

17. The processing device of claim 13, wherein the at least one processor further executes the instructions to: transmit SCI including the first priority value to the second device, based on a third SL resource among the periodic transmission resources.

18. The processing device of claim 17, wherein whether to reselect the first SL resource is determined based on determination on whether pre-emption is applied to the first SL resource.

19. The processing device of claim 18, wherein it is determined that the pre-emption is applied to the first SL resource, based on that the second priority value is greater than a third priority value included in SCI received by the first device.

20. The processing device of claim 13, wherein whether to resoled the first SL resource is determined, based on determination on whether re-evaluation is applied to the first SL resource.

* * * * *